Sept. 8, 1942.  F. H. SANDHERR  2,295,490
STUFFING BOX GLAND
Filed April 12, 1941
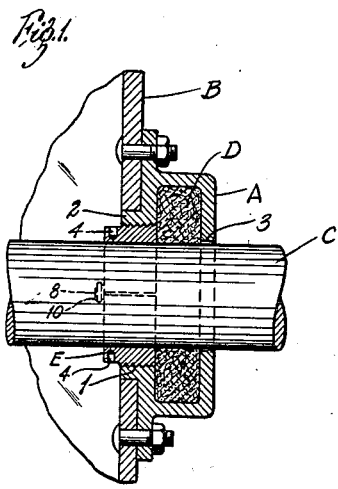
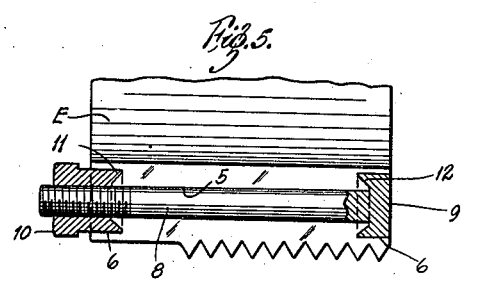
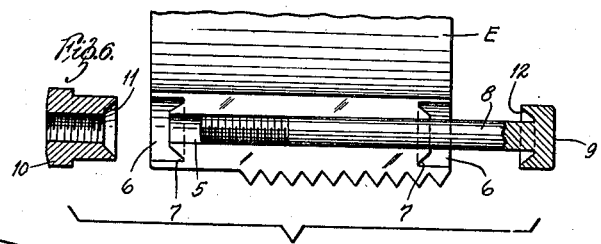
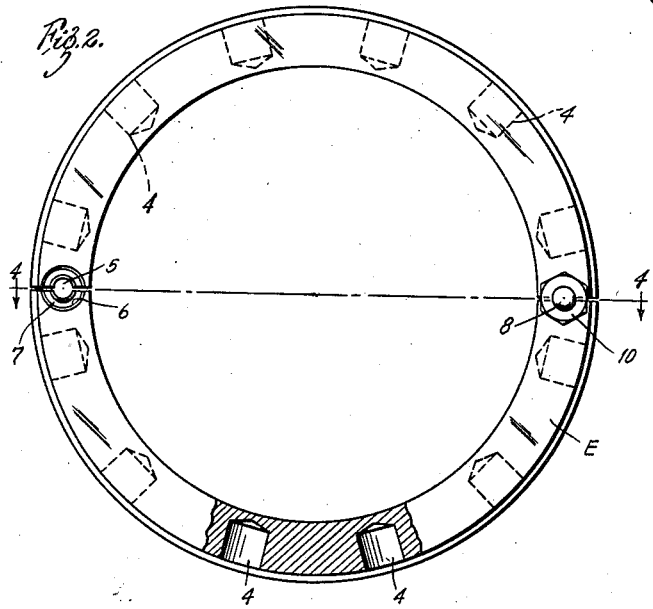
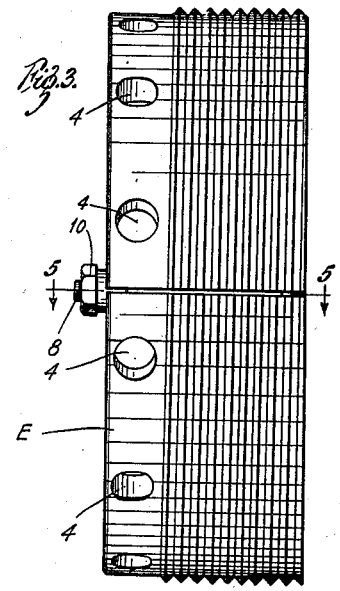
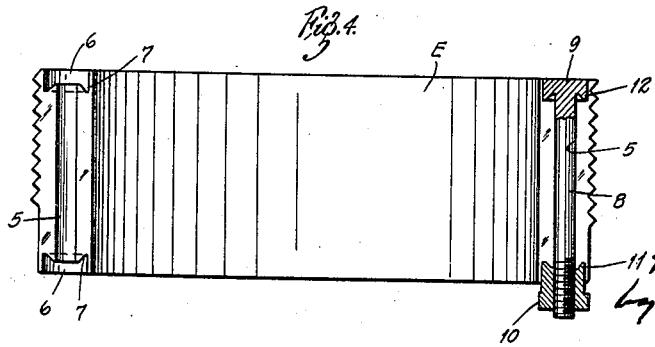
INVENTOR:
Frederick H. Sandherr
HIS ATTORNEYS.

Patented Sept. 8, 1942

2,295,490

UNITED STATES PATENT OFFICE 2,295,490

STUFFING BOX GLAND

Frederick H. Sandherr, St. Louis, Mo., assignor to Concrete Transport Mixer Company, St. Louis, Mo., a corporation of Missouri Application April 12, 1941, Serial No. 388,194

3 Claims. (Cl. 286—35)

This invention relates to glands or followers for compressing the packing of a stuffing box around a shaft or rod working therein. The invention has for its principal object to provide a simple and efficient split stuffing box gland which can be readily adjusted longitudinally of the shaft or rod to compress the packing and quickly and easily assembled and disassembled for attachment and removal from the shaft or rod laterally thereof. The invention consists in the stuffing box gland or follower and the construction, combinations and arrangements of parts hereinafter described and claimed.

In the accompanying drawing, which forms part of this specification and wherein like symbols refer to like parts wherever they occur:

Fig. 1 is a central longitudinal section through a stuffing box construction provided with a packing gland embodying my invention, Fig. 2 is an enlarged end view of the packing gland, Fig. 3 is a side elevational view thereof, Fig. 4 is a central longitudinal section along a diameter including the axis of the gland and the axes of the bolts which secure the two segments of said gland together, Fig. 5 is an enlarged fragmentary longitudinal section on the line 5—5 in Fig. 3; and Fig. 6 is a view similar to Fig. 5, showing the nut removed from the bolt and the nut and the head of the bolt disengaged from the counterbores of the ends of the bolt receiving bore.

In the accompanying drawing, my packing gland is illustrated in connection with a stuffing box construction comprising a packing box A that is bolted or otherwise secured to the wall of a reservoir or housing B adapted to contain water, steam or other fluid. The inner end wall of the packing box A has an internally threaded hole 1 therethrough an outstanding annular flange 2 that surrounds the outer end of said hole and has a snug fit in a circular opening provided therefor in the wall of the reservoir or housing B. The outer end wall of the packing box A has a circular opening 3 extending therethrough concentric with the internally threaded opening 1 in the inner wall of said box. A shaft, rod or other moving part C passes through the holes 1 and 3 in the end walls of the stuffing box A; and said stuffing box has an annular chamber therein between its end walls containing a suitable flexible packing material D which surrounds said shaft or rod and serves to prevent leakage of fluid or the passage of dust or other foreign matter through the joint between said shaft or rod and packing.

Sleeved on the shaft or rod C is a gland or follower in the form of an externally threaded sleeve E which is threaded into the internally threaded opening 1 in the inner wall of the stuffing box A and is adapted to press endwise against said packing D to thereby compress the same and thus maintain a tight fit thereof around said shaft or rod. The portion of the gland E located externally of the packing box A has a series of circumferentially spaced holes 4 in the periphery thereof adapted to receive the pin of a spanner wrench used for rotating said gland. The stuffing box gland E has two diametrically spaced bores 5 extending therethrough from end to end thereof; and each of said bores has a counterbore 6 at each end thereof and an annular groove 7 at the bottom of each counterbore.

Extending through each of the bores 5 is a bolt 8 having a head 9 at one end thereof and a nut 10 threaded on the other end thereof, said head seating against the bottom of the counterbore at one end of said bore and said nut seating against the bottom of the counterbore at the opposite end of said bore. As shown in the drawing, the inner end of the nut 10 for each bolt 8 is countersunk to form an annular rib 11, which tapers in width from the bottom thereof to the top thereof, while the inner end of the head 9 of said bolt has an annular rib 12 thereon of the same size and shape as the annular rib on the inner end of the nut. The bolt 8 extends through the bore 5, with the annular rib 12 on the head 9 of the bolt seating in the annular groove 7 in the counterbore occupied by said head; and the nut 10 is threaded on the bolt, with the annular rib 11 at the inner end of said nut seating in the annular groove at the bottom of the counterbore occupied by said nut. The packing gland E is longitudinally divided into duplicate segments along a diameter of said sleeve including the axis of each of the bolt receiving bores 5 thereof.

By the arrangement described, the split packing gland E may be quickly and easily mounted on the shaft or rod C by placing the two halfsections of said gland around said shaft or rod, slipping the bolts 8 into the bores 5 and screwing home the nuts 10 on the respective bolts. When the nuts 10 are tightened on the bolts 8, the annular ribs 11 on the nuts and the annular ribs 12 on the bolt heads 9 seat in the annular grooves 7 in the counterbores 6 and the cooperating inclined surfaces of the interlocked ribs and grooves operate to draw the two half-sections of the packing gland together until the adjacent ends of said section abut against the bolts 8 therebetween or against each other, thus rigidly securing the two packing gland sections together. The packing gland may then be threaded into the packing box A to compress the packing D therein. When it is desired to remove the packing gland E from the shaft or rod C, the gland is unscrewed from the box and the nuts 10 are removed from the bolts 8, thus permitting the two gland sections to be separated.

The invention is not limited to the particular stuffing box construction shown and described.

What I claim is:

1. A stuffing box gland comprising an externally threaded cylindrical sleeve having a plurality of circumferentially spaced bores extending therethrough from end to end thereof, at least one end of each bore having a counterbore and an annular groove at the bottom thereof, and a bolt having a body extending through said bore and having a head at one end and a nut on the other end, one of said head and nut seating in said counterbore and having a continuous annular rib at its inner end rotatable in the annular groove at the bottom of said counterbore, said sleeve being longitudinally divided into segments along a plane including the axis of each of said bores, said annular groove and rib having conical cooperating surfaces adapted when said nut is tightened to clamp said conical surfaces together and thereby to draw said segments together.

2. A stuffing box gland comprising a cylindrical sleeve having a plurality of circumferentially spaced bores extending therethrough from end to end thereof, at least one end of each bore having a counterbore and an annular groove at the bottom thereof, a bolt extending through said bore and having a head at one end and a nut at the other end, said head seating in said counterbore and having a continuous annular rib at its inner end seating in the annular groove at the bottom of said counterbore of all rotary positions of said head therein, said sleeve being longitudinally divided along a plane including the axis of each of said bores.

3. A stuffing box gland comprising an externally threaded cylindrical sleeve having two diametrically spaced bores extending therethrough from end to end thereof, each of said bores having a counterbore at each end thereof and an annular groove at the bottom of each counterbore, a bolt extending through said bore and having a head and a nut disposed in and seating against the bottoms of the respective counterbores of said bore, said head and nut each having a continuous annular rib at its inner end seating in the annular groove in the bottom of the counterbore occupied thereby, said sleeve being longitudinally divided into segments along a diameter including the axes of said diametrically spaced bores, each of said annular grooves and ribs having conical cooperating surfaces adapted to draw said segments together when the nuts of said bolts are tightened in the counterbores occupied thereby.

FREDERICK H. SANDHERR.